US009215730B2

(12) United States Patent
Dai et al.

(10) Patent No.: US 9,215,730 B2
(45) Date of Patent: Dec. 15, 2015

(54) METHOD FOR TRANSMITTING THE PDCCH SIGNAL

(75) Inventors: Bo Dai, Shenzhen (CN); Peng Hao, Shenzhen (CN); Shuqiang Xia, Shenzhen (CN); Guanghui Yu, Shenzhen (CN); Chunli Liang, Shenzhen (CN)

(73) Assignee: ZTE Corporation, Shenzhen (CN)

( * ) Notice: Subject to any disclaimer, the term of this patent is extended or adjusted under 35 U.S.C. 154(b) by 428 days.

(21) Appl. No.: 12/995,928

(22) PCT Filed: Dec. 10, 2008

(86) PCT No.: PCT/CN2008/073439
§ 371 (c)(1),
(2), (4) Date: Dec. 2, 2010

(87) PCT Pub. No.: WO2009/155764
PCT Pub. Date: Dec. 30, 2009

(65) Prior Publication Data
US 2011/0103272 A1      May 5, 2011

(30) Foreign Application Priority Data
Jun. 23, 2008   (CN) .......................... 2008 1 0131850

(51) Int. Cl.
*H04J 11/00*        (2006.01)
*H04W 4/00*        (2009.01)
(Continued)

(52) U.S. Cl.
CPC .......... *H04W 72/14* (2013.01); *H04W 72/1289* (2013.01)

(58) Field of Classification Search
CPC .......................... H04W 72/14; H04W 72/1289
USPC .................................................. 370/208, 329
See application file for complete search history.

(56) References Cited

U.S. PATENT DOCUMENTS 7,386,011 B2 *   6/2008   Haim ............................ 370/471
2008/0232395 A1*   9/2008   Buckley et al. ............... 370/465
(Continued)

FOREIGN PATENT DOCUMENTS

CN          101184076 A        5/2008
CN          101309523 A        5/2008

OTHER PUBLICATIONS

Physical Channels and Modulation, Mar. 2008 3GPP TS 36.211 V8.2.0, pp. 1-65.*
(Continued)

*Primary Examiner* — Steven H Nguyen
(74) *Attorney, Agent, or Firm* — Husch Blackwell LLP

(57) ABSTRACT

The present invention provides a method for transmitting a PDCCH (physical downlink control channel) signal, when the number of available resource blocks of the downlink bandwidth in a radio frame is less than or equal to k, 2 symbols are fixedly used to transmit the physical downlink control channel, wherein k is a natural number. The present invention further provides another method for transmitting a PDCCH signal. In a TDD Long Term Evolution system, when the number of available resource blocks of the downlink bandwidth in a radio frame is less than or equal to k and the uplink/downlink switching period is 10 ms, the transmitting end selects 2, 3 or 4 symbols to transmit the PDCCH signal in subframe 6. With the transmission method of the PDCCH signal provided in the present invention, the utilization efficiency of the system resources and the transmission performance of PDCCH can be improved.

13 Claims, 1 Drawing Sheet

(51) Int. Cl.
*H04W 72/14* (2009.01)
*H04W 72/12* (2009.01)

(56) References Cited

U.S. PATENT DOCUMENTS

| | | | |
|---|---|---|---|
| 2008/0253318 A1* | 10/2008 | Malladi et al. | 370/328 |
| 2009/0154607 A1* | 6/2009 | Lindoff et al. | 375/341 |
| 2009/0241004 A1* | 9/2009 | Ahn et al. | 714/749 |
| 2009/0259909 A1* | 10/2009 | Luo | 714/748 |
| 2009/0268693 A1* | 10/2009 | Lindh et al. | 370/336 |
| 2010/0118800 A1* | 5/2010 | Kim et al. | 370/329 |
| 2010/0232379 A1* | 9/2010 | Molnar et al. | 370/329 |
| 2011/0002293 A1* | 1/2011 | Yuk et al. | 370/329 |
| 2011/0205942 A1* | 8/2011 | Lindh et al. | 370/294 |

OTHER PUBLICATIONS

LG Electronics, DL PDCCH/PCFICh/RS Transmission in MBSFN Subframe, Aug. 20-24, 2007, pp. 1-2, Athens Greece.

Ericsson, Change Request, 3GPP TSG-RAN Meeting #53, May 5-9, 2008, pp. 1-13, Kansas City Missouri.

3GPP TSG-RAN Meeting #53 May 5-9, 2008, pp. 1-2, Kansas City, MO, USA.

3GPP TS 36.211; 3rd Generation Partnership Project; Technical Specification Group Radio Access Network; Evolved Universal Terrestrial Radio Access (E-UTRA); Physical Channels and Modulation (Release 8), pp. 1-75.

* cited by examiner

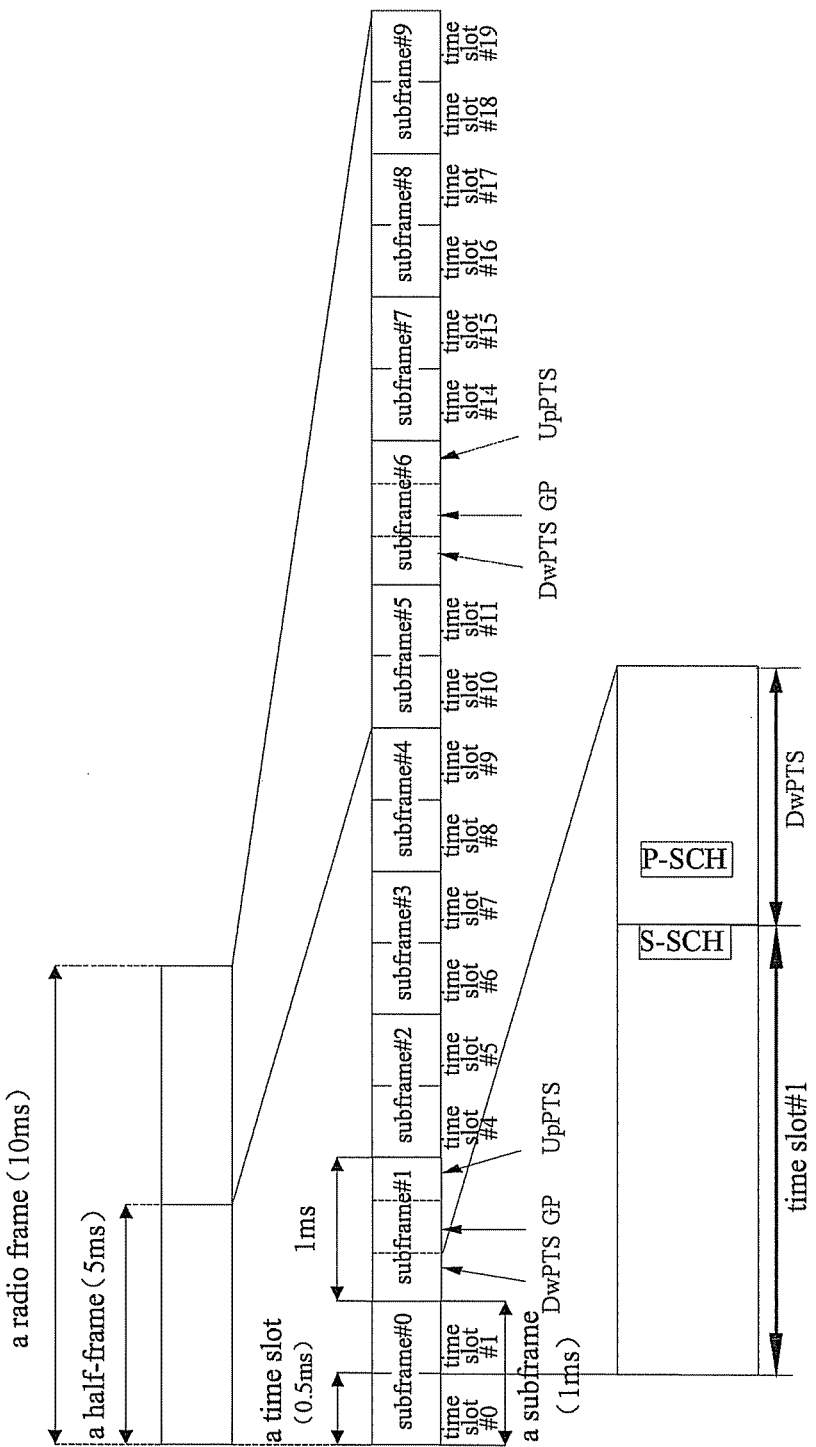

METHOD FOR TRANSMITTING THE PDCCH SIGNAL

TECHNICAL FIELD

The present invention relates to channel transmission in the filed of communication, and in particular, to a method for transmitting a physical downlink control channel (PDCCH) signal.

BACKGROUND ART

A frame structure of the TDD (time division duplex) mode in an LTE (Long Term Evolution) system is shown in FIG. 1. In this frame structure, a radio frame of 10 ms is divided into two half-frames; each half-frame is divided into 10 time slots, each of which has a length of 0.5 ms, and two time slots form a subframe of 1 ms. A radio frame includes 10 subframes (numbered from 0 to 9), and a radio frame includes 20 time slots (numbered from 0 to 19). As for a normal cyclic prefix (CP) with a length of 5.21 us and 4.69 us, a time slot includes 7 uplink/downlink symbols, each of which has a length of 66.7 us, wherein the length of the cyclic prefix of the first symbol is 5.21 us, and the length of the cyclic prefix of the other six symbols is 4.69 us; as for an extended cyclic prefix with a length of 16.67 us, a time slot includes 6 uplink/downlink symbols. Additionally, in this frame structure, the features of the configuration of the subframe are as follows:

Subframe 0 and subframe 5 are always reserved for downlink transmission;

Supporting 5 ms and 10 ms downlink-to-uplink switch-point periodicity;

Subframe 1 and subframe 6 are special subframes and are used to transmit 3 special time slots: DwPTS (Downlink Pilot Time Slot), GP (Guard Period) and UpPTS (Uplink Pilot Time Slot), wherein, DwPTS is used for downlink transmission and includes at least 3 OFDM (Orthogonal Frequency Division Multiplexing) symbols;

GP is the guard period and does not transmit any data;

UpPTS is used for uplink transmission and includes at least 2 symbols for transmitting PRACH (Physical Random Access Channel).

In case of 5 ms downlink-to-uplink switch-point periodicity, subframe 2 and subframe 6 are fixedly used for uplink transmission;

In case of 10 ms downlink-to-uplink switch-point periodicity, DwPTS exists in the two half-frames, GP and UpPTS exist in the first half-frame, the DwPTS duration in the second half-frame is 1 ms, subframe 2 is used for uplink transmission, and subframe 7 to subframe 9 are used for downlink transmission;

P-SCH (Primary-Synchronization) is transmitted on the third OFDM symbol of DwPTS; S-SCH (Secondary-Synchronization) is transmitted on the last OFDM symbol of time slot 1 and time slot 11;

The present protocol specifies that in a TDD system, the number of symbols in subframe 1 and subframe 6 for transmitting physical downlink control channel signals is 1 or 2. Herein, the signal carried on the channel is directly called as the channel signal.

A radio frame in a FDD (frequency division duplex) system also includes 2 half-frames, wherein each half-frame includes 5 subframes, and each subframe includes two time slots. However, since it is a frequency division system, there is no downlink-to-uplink switch-point or special subframes such as subframe 1 and subframe 6 in a TDD system.

At present, when there is no physical downlink shared channel in a MBSFN (Multiple Broadcast Single Frequency Network) subframe, there is no physical downlink control channel in this subframe either. When there is a physical downlink shared channel in a MBSFN subframe, the number of symbols in the subframe for transmitting physical downlink control channel signals is 1 or 2.

As for other normal subframes (referring to normal subframes in TDD and FDD systems), when the number of available resource blocks of the downlink bandwidth in a radio frame is less than or equal to k (k=10), the number of symbols for transmitting physical downlink control channel signals is 2, 3, or 4; in other cases, the number of symbols for transmitting physical downlink control channel signals is 1, 2, or 3.

At present, the number of symbols for transmitting physical downlink control channel signals is indicated by PCFICH (Physical Control Format Indicator Channel) in the subframe. PCFICH is transmitted on the first symbol of the subframe, and occupies 4 Resource element groups (REG) on the frequency domain. However, the transmission of PCFICH will decrease the utilization efficiency of the system resources, and reduce available PDCCH resources, thus affecting the performance of the PDCCH.

Additionally, in TDD system, the existing protocol specifies that when the number of available resource blocks of the downlink bandwidth is less than or equal to k (k=10) and the downlink-to-uplink switch-point period is 10 ms, the maximum number of symbols in subframe 6 for transmitting physical downlink control channel signals is 2, while the number of symbols in other normal frames for transmitting physical downlink control channel signals is 2, 3 or 4, in such a case, the cell coverage supported by subframe 6 is lower than that supported by other subframes, thus causing a degradation of performance of the system. When the number of available resource blocks of the downlink bandwidth is greater than k (k=10) and the downlink-to-uplink switch-point period is 10 ms, the number of symbols in subframe 6 for transmitting physical downlink control channel signals is at most 2.

SUMMARY OF THE INVENTION

The technical problem to be solved in the present invention is to provide a method for transmitting a physical downlink control channel signal to improve utilization efficiency of the system resources and the transmission performance of the physical downlink control channel.

In order to solve the above technical problem, the present invention provides a method for transmitting a physical downlink control channel signal, comprising:

when the number of available resource blocks of the downlink bandwidth in a radio frame is less than or equal to k, fixedly using 2 symbols to transmit the physical downlink control channel signal, wherein k is a natural number.

Furthermore, the method is also characterized in that:

the transmitting end uses the first symbol and the second symbol of the subframe to transmit the physical downlink control channel signal.

Furthermore, the method is also characterized in that:

the transmitting end does not set any physical control format indicator channel in the subframe.

Furthermore, the method is also characterized in that:

the subframe is subframe 1 and subframe 6 in a frame structure used in a Long Term Evolution (LTE) system, in the Time Division Duplex mode, k=10; or the subframe is a Multiple Broadcast Single Frequency Network subframe in a frame structure used in an LTE system in the Frequency Division Duplex mode, k=10.

Furthermore, the method is also characterized in that:

the receiving end receives the physical downlink control channel signal based on situations of the two symbols according to related downlink control signaling, when judging that the number of available resource blocks of the downlink bandwidth is less than or equal to 10.

The method also provides a method for transmitting a physical downlink control channel signal, comprising:

when the number of available resource blocks of the downlink bandwidth in a radio frame is less than or equal to k, the transmitting end does not set any physical control format indicator channel in the subframe; the transmitting end selects 1 or 2 symbols to transmit the physical downlink control channel signal, wherein k is a natural number.

Furthermore, the method is also characterized in that:

the transmitting end uses the first symbol of the subframe, or the first symbol and the second symbol of the subframe to transmit the physical downlink control channel signal.

Furthermore, the method is also characterized in that:

the subframe is subframe 1 and subframe 6 in a frame structure used in a Long Term Evolution (LTE) system, in Time Division Duplex mode, k=10; or the subframe is a Multiple Broadcast Single Frequency Network subframe in a frame structure used in a Long Term Evolution system in the Frequency Division Duplex mode, k=10.

Furthermore, the method is also characterized in that:

the receiving end receives the physical downlink control channel signal firstly based on the situation of one symbol by way of blind detection according to related downlink control signaling, when judging that the number of available resource blocks of the downlink bandwidth is less than or equal to 10; if the receiving end does not succeed, it receives the physical downlink control channel signal based on situations of two symbols.

The method also provides a method for transmitting a physical downlink control channel signal, comprising:

in the LTE system in TDD mode, when the number of available resource blocks of the downlink bandwidth in a radio frame is less than or equal to k and the downlink-to-uplink switch-point period is 10 ms, the transmitting end selects 2, 3 or 4 symbols in subframe 6 to transmit the physical downlink control channel signal, wherein k is a natural number.

Furthermore, the method is also characterized in that:

the transmitting end selects the first and second symbols, or the first, second and fourth symbols, or the first, second, fourth and fifth symbols in subframe 6 to transmit the physical downlink control channel signal.

Furthermore, the method is also characterized in that:

when the number of available resource blocks of the downlink bandwidth in a radio frame is greater than k and the downlink-to-uplink switch-point period is 10 ms, the transmitting end selects 1, 2 or 3 symbols in subframe 6 to transmit the physical downlink control channel signal, wherein k is a natural number.

Furthermore, the method is also characterized in that:

when the number of available resource blocks of the downlink bandwidth in a radio frame is greater than k, the transmitting end selects the first symbol, or the first and second symbols, or the first, second and fourth symbols in subframe 6 to transmit the physical downlink control channel signal.

Furthermore, the method is also characterized in that: k=10.

The present invention also provides a method for transmitting a physical downlink control channel signal, comprising:

in an LTE system in TDD mode, when the number of available resource blocks of the downlink bandwidth in a radio frame is less than or equal to k, the downlink-to-uplink switch-point period is 5 ms and a ratio of the number of downlink time slots to the number of uplink time slots in the radio frame is 1:3, the transmitting end selects n symbols in a normal subframe to transmit the physical downlink control channel signal, wherein n is 2, 3, 4 or 5, and k is a natural number.

Furthermore, the method is also characterized in that: k=10.

The transmission method of the PDCCH signal provided in the present invention solves the problems of wasting of resource and the degradation of the transmission performance of the PDCCH in special scenarios, and improves the utilization efficiency of the system resources and the transmission performance of PDCCH.

BRIEF DESCRIPTION OF DRAWINGS

FIG. 1 illustrates a frame structure in an LTE TDD system.

PREFERRED EMBODIMENTS OF THE INVENTION

Some specific examples of the method according to the present invention are provided below with reference to the FIGURE for better understanding the present invention.

The First Embodiment

When the number of available resource blocks of the downlink bandwidth in a radio frame is less than or equal to 10 (or other specified values):

In a TDD system, the transmitting end does not set any physical control format indicator channel in subframe 1 and subframe 6, the resources for transmitting physical control format indicator channel signals are used to transmit physical downlink control channel signals; the number of symbols for transmitting physical downlink control channel signals is 2, for example the first and second symbols of subframe 1 and subframe 6 are used.

In a FDD system, when there is a physical downlink shared channel in a MBSFN subframe for transmission, the transmitting end does not set any physical control format indicator channel in the subframe, the resources for transmitting physical control format indicator channel signals are used to transmit physical downlink control channel signals; the number of symbols for transmitting physical downlink control channel signals is 2, for example the first and second symbols of the subframe are used.

In the above TDD and FDD systems, since when the number of available resource blocks of the downlink bandwidth is less than or equal to 10, the number of symbols in the above subframes for transmitting physical downlink control channel signals can only be 2, the receiving end receives the physical downlink control channel signals based on situations of two symbols according to related downlink control signaling, when judging that the number of downlink bandwidth available resource blocks is less than or equal to 10. There is no limit in the present invention on whether to set a physical control format indicator channel, so a physical control format indicator channel may also be set, but in any case 2 symbols are fixedly used for transmitting physical downlink control channel signals.

The Second Embodiment

When the number of available resource blocks of the downlink bandwidth in a radio frame is less than or equal to 10:

in a TDD system, the transmitting end does not set any physical control format indicator channel in subframe 1 and subframe 6, the resources for transmitting physical control format indicator channel signals are used to transmit physical downlink control channel signals, and the number of symbols for transmitting physical downlink control channel signals is 1 or 2, for example the first symbol or the first and second symbols of subframe 1 and subframe 6.

In a FDD system, when there is a physical downlink shared channel in a MBSFN subframe for transmission, the transmitting end does not set any physical control format indicator channel in the subframe, the resources for transmitting physical control format indicator channel signals are used to transmit physical downlink control channel signals, and the number of symbols for transmitting physical downlink control channel signals is 1 or 2, for example the first symbol or the first and second symbols of the subframe.

In the above TDD and FDD systems, the receiving end receives the physical downlink control channel signal firstly based on the situation of one symbol by way of blind detection according to related downlink control signaling, when judging that the number of available resource blocks of the downlink bandwidth is less than or equal to 10, i.e., adopting decoding and demodulation corresponding to this situation; If the receiving end does not succeed, it receives the physical downlink control channel signal based on situations of two symbols.

Since no physical control format indicator channel is set in the specific subframes in the above two embodiments, the utilization efficiency of the system resources can be improved and the number of symbols for transmitting physical downlink control channel signals is increased.

The Third Embodiment

In a TDD system, when the number of available resource blocks of the downlink bandwidth in a radio frame is less than or equal to 10 and the downlink-to-uplink switch-point period is 10 ms, the transmitting end uses 2, 3 or 4 symbols in subframe 6 to transmit the physical downlink control channel signals, for example, the first and second symbols, or the first, second and fourth symbols, or the first, second, fourth and fifth symbols in the subframe are used.

In a TDD system, when the number of available resource blocks of the downlink bandwidth in a radio frame is greater than 10 and the downlink-to-uplink switch-point period is 10 ms, the transmitting end uses 1, 2 or 3 symbols in subframe 6 to transmit the physical downlink control channel signals, for example, the first symbol, or the first and second symbols, or the first, second and fourth symbols in the subframe are used.

In the above two technical schemes, the use of the specific number of symbols in subframe 6 for transmitting physical downlink control channel signals may be determined according to the cell range to be covered currently; more symbols can be used when the transmitting end is relatively far from the base station. In this way, the problems that the cell coverage supported by subframe 6 is lower than those supported by other subframes and the deterioration of the system performance can be avoided.

The Fourth Embodiment

In a TDD system, when the number of available resource blocks of the downlink bandwidth is less than or equal to 10, the downlink-to-uplink switch-point period is 5 ms and a ratio of the number of downlink time slots to the number of uplink time slots in the radio frame is 1:3, since in this case one downlink subframe has to transmit related resource distribution control signaling of a plurality of uplink subframes and the number of symbols may not be sufficient, the transmitting end in this case according to this embodiment uses the first n symbols in a normal subframe (subframes other than subframe 1 and subframe 6) to transmit the physical downlink control channel signals, wherein n may be 2, 3, 4 or 5.

The above embodiments are only preferred embodiments of the present invention, and are not intended to limit the present invention. For a person having ordinary skill in the art, the present invention may have various modifications and variations. All modifications, equivalent replacements, improvements, etc. made to the present invention within the spirit and principle of the present invention shall fall into the scope of the claims of the present invention.

INDUSTRIAL APPLICABILITY

The present invention provides a method for transmitting physical downlink control channel (PDCCH), solves the problems of the wasting of resources and the degradation of the transmission performance of the PDCCH in special scenes, and improves the utilization efficiency of the system resources and the transmission performance of the PDCCH.

What we claim is:

1. A method for transmitting a physical downlink control channel signal, comprising:
    selecting at least one subframe in a radio frame for the physical downlink control signal; and
    a transmitting end transmitting the physical downlink control channel signal with a number of Orthogonal Frequency Division Multiplexing (OFDM) symbols in the selected subframe;
    in a case that the number of available resource blocks of the downlink bandwidth in the radio frame is less than or equal to k, the number of the OFDM symbols for transmitting the physical downlink control channel signal in each selected subframe is fixedly to be two, wherein k is a natural number;
    the subframe is subframe 1 and subframe 6 in a frame structure used in a Long Term Evolution (LTE) system in the Time Division Duplex mode, k=10; or
    the subframe is a Multiple Broadcast Single Frequency Network subframe in a frame structure used in an LTE system in the Frequency Division Duplex mode, k=10.

2. The method according to claim 1, wherein:
    the transmitting end uses a first OFDM symbol and a second OFDM symbol of the subframe to transmit the physical downlink control channel signal.

3. The method according to claim 2, wherein: the transmitting end does not set any physical control format indicator channel in the subframe to indicate the number of the OFDM symbols for transmitting the physical downlink control channel signal.

4. The method according to claim 1, wherein:
    a receiving end receives the physical downlink control channel signal based on situations of the two OFDM symbols according to related downlink control signaling, when judging that the number of available resource blocks of the downlink bandwidth is less than or equal to 10.

5. A method for transmitting a physical downlink control channel signal, comprising:
   selecting at least one subframe in a radio frame for the physical downlink control signal; and
   a transmitting end transmitting the physical downlink control channel signal with Orthogonal Frequency Division Multiplexing (OFDM) symbols in the selected subframe;
   in a case that the number of available resource blocks of the downlink bandwidth in a radio frame is less than or equal to k, the transmitting end does not set any physical control format indicator channel in the subframe, and selects 1 or 2 OFDM symbols to transmit the physical downlink control channel signal, wherein k is a natural number;
   the subframe is subframe 1 and subframe 6 in a frame structure used in a Long Term Evolution (LTE) system in the Time Division Duplex mode, k=10; or
   the subframe is a Multiple Broadcast Single Frequency Network subframe in a frame structure used in an LTE system in the Frequency Division Duplex mode, k=10.

6. The method according to claim 5, wherein:
   the transmitting end uses the first OFDM symbol of the subframe, or the first OFDM symbol and the second OFDM symbol of the subframe to transmit the physical downlink control channel signal.

7. The method according to claim 5, wherein:
   the receiving end receives the physical downlink control channel signal firstly based on the situation of one OFDM symbol by way of blind detection according to related downlink control signaling, when judging that the number of available resource blocks of the downlink bandwidth is less than or equal to 10; if the receiving end does not succeed, it receives the physical downlink control channel signal based on situations of two OFDM symbols.

8. A method for transmitting a physical downlink control channel signal, comprising:
   in a Long Term Evolution (LTE) system with the Time Division Duplex mode, selecting Orthogonal Frequency Division Multiplexing (OFDM) symbols in subframe 6 for the physical downlink control signal; and
   a transmitting end transmitting the physical downlink control channel signal with selected OFDM symbols;
   in a case that the number of available resource blocks of the downlink bandwidth in a radio frame is less than or equal to k and the downlink-to-uplink switch-point period is 10 ms, the transmitting end selects the first, second and fourth OFDM symbols to transmit the physical downlink control channel signal, or the transmitting end selects the first, second, fourth and fifth OFDM symbols in subframe 6 to transmit the physical downlink control channel signal, wherein k is a natural number.

9. The method according to claim 8, wherein:
   when the number of available resource blocks of the downlink bandwidth in a radio frame is greater than k and the downlink-to-uplink switch-point period is 10 ms, the transmitting end selects the first, second and fourth OFDM symbols in subframe to transmit the physical downlink control channel signal, wherein k is a natural number.

10. The method according to claim 8, wherein: k=10.

11. The method according to claim 9, wherein: k=10.

12. A method for transmitting a physical downlink control channel signal, comprising:
   in a Long Term Evolution system with Time Division Duplex mode, selecting Orthogonal Frequency Division Multiplexing (OFDM) symbols in a normal subframe for the physical downlink control signal; and
   a transmitting end transmitting the physical downlink control channel signal with OFDM symbols;
   in a case that the number of available resource blocks of the downlink bandwidth in a radio frame is less than or equal to k, the downlink-to-uplink switch-point period is 5 ms and a ratio of the number of downlink time slots to the number of uplink time slots in the radio frame is 1:3, maximum number of OFDM symbols in the normal subframe selected to transmit the physical downlink control channel signal is 5, and k is a natural number.

13. The method according to claim 12, wherein: k=10.

* * * * *